Nov. 2, 1943.    M. G. LEONARD    2,333,537
PROTECTIVE DEVICE FOR ELECTRICAL APPARATUS
Filed March 25, 1942    3 Sheets-Sheet 1

WITNESSES:
Edward Michaels
Thos. C. Groome

INVENTOR
Merrill G. Leonard.
BY
Franklin E. Hardy
ATTORNEY

Nov. 2, 1943. M. G. LEONARD 2,333,537
PROTECTIVE DEVICE FOR ELECTRICAL APPARATUS
Filed March 25, 1942 3 Sheets-Sheet 2
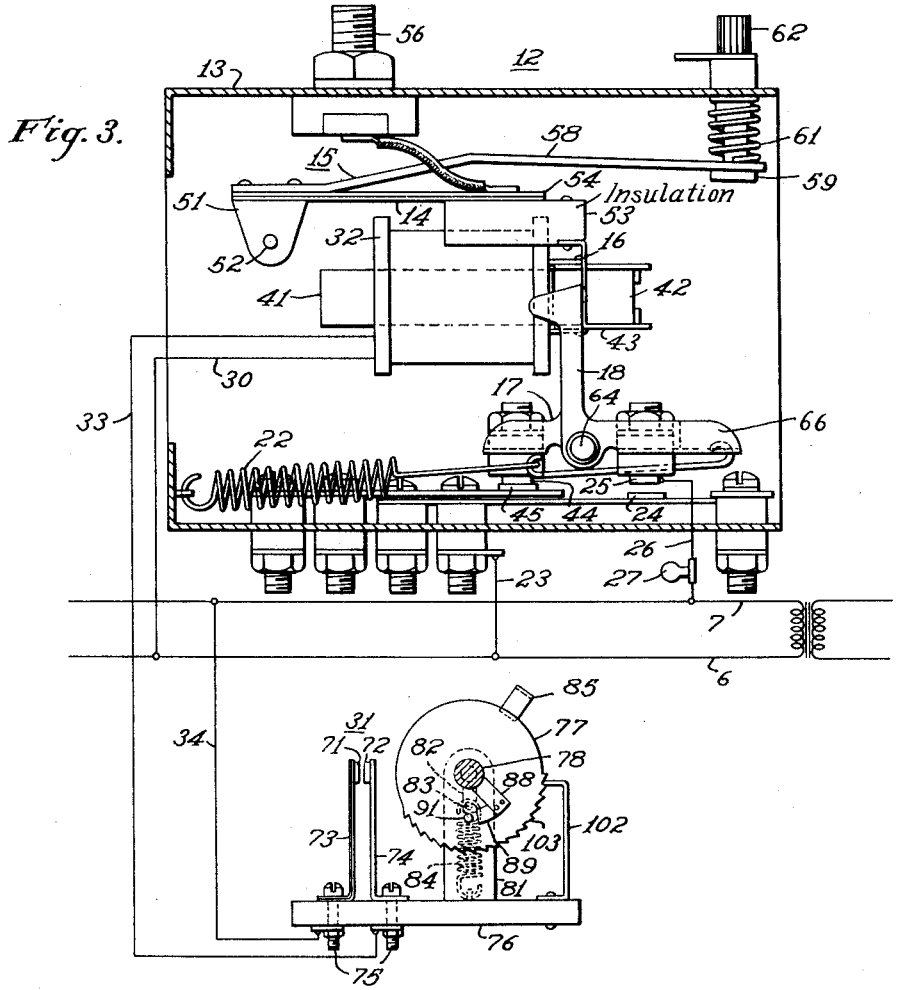
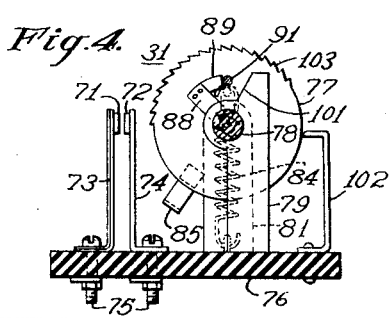
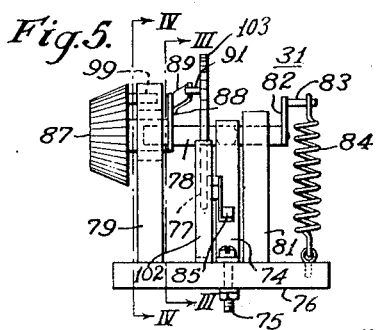
WITNESSES:
Edward Michaels
INVENTOR
Merrill G. Leonard.
BY
Franklin E. Hardy
ATTORNEY

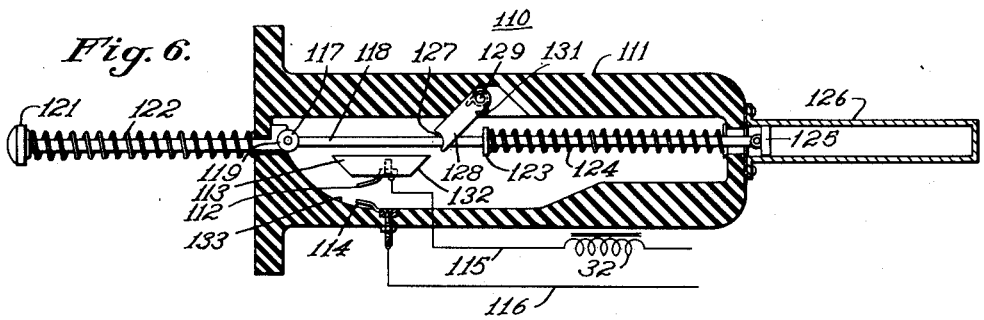

Patented Nov. 2, 1943

2,333,537

UNITED STATES PATENT OFFICE 2,333,537

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application March 25, 1942, Serial No. 436,078

10 Claims. (Cl. 175—294)

This invention relates to protective equipment for electrical apparatus and, more particularly to circuit controlling devices for use in such electrical apparatus.

In such electrical apparatus, it is frequently desired to provide means for protecting the apparatus from damage that may be caused by overheating due to overloading the apparatus, and it is common practice to provide a circuit breaker controlled by a thermally responsive element that is operative to interrupt the load circuit of the apparatus upon the occurrence of a predetermined condition. A condition that might be used for causing the circuit breaker to operate to interrupt the load circuit is the heating of the apparatus caused by an overload that is sustained for too long a period. The thermally responsive element may also be effective to give an indication somewhat prior to the occurrence of a condition necessary to unload the apparatus indicating that such a condition is nearly reached.

In distribution apparatus, where the amount of power used per unit is small, it is usual to provide the circuit breaker as above described for directly interrupting the load circuit on the low voltage side and to provide mechanical means having an operating handle extending outside the apparatus for manually resetting the thermally responsive control device after it has operated in response to the predetermined condition, so that the device will again be positioned ready to operate upon a repetition of the condition. In larger apparatus, the same type of circuit breaker device may be used as a relay for controlling a main breaker so that both sets of breaker contacts, that is, those which control the alarm or indicating signal circuit and those which control the circuit for interrupting the main load current through the apparatus may both be used to control relay circuits.

In my copending application for Protective devices for electrical apparatus, filed December 5, 1941, Serial No. 421,787, and assigned to the same assignee as this application, a protective system is described in which a crcuit breaker controlling device is employed that is sensitive to the condition of an electrical apparatus as determined by a thermally responsive element which is arranged to release a plurality of latch arms. One of these latch arms trips when a predetermined limiting condition on the apparatus occurs in order to effect the loading of the apparatus, and the other trips prior to the occurrence of this limiting condition to indicate that the condition is nearly reached. This second named latch when released operates to close a circuit including a high impedance indicating device and a resetting device that when sufficiently energized operates to return the two latch arms to their initial position from which they may be again released upon a further occurrence of the predetermined condition of the apparatus effecting their operation.

When, as in the system of my above referred to application, the operating coil of the resetting device is connected in series circuit relation with the high impedance indicating device, the resetting device is not sufficiently energized to cause its operation. It is necessary, therefore, to shunt the high impedance device from the series circuit when it is desired to effect the operation of the resetting device. In my copending application above referred to, such a switch is provided for shunting the high impedance device from the series circuit. In the circuit arrangement provided in the copending application, the circuit through the resetting coil which returns the latch arms to their normal or latched positions includes switch contact members that are separated by movement of the latch to such positions so that the energizing circuit of the coil may be interrupted slightly prior to the completion of the return of the latch arms to their latched positions, the completion of this operation depending upon the inertia of the moving armature cooperating with the coil.

It is an object of the present invention to provide protective equipment for electrical apparatus of the above-indicated character in which means are provided for energizing the resetting device that is independent of the latch controlled circuit, and that automatically interrupts the resetting device energizing circuit independently of the operator.

Other objects and advantages of the invention will be apparent from the following description of a preferred embodiment of the invention, reference being had to the accompanying drawings, in which:

Fig. 3 is a diagrammatic view including a sectional view of the relay device taken along the lines III—III in Fig. 2, and a sectional view of a resetting switch mechanism taken along the lines III—III in Fig. 5;

Fig. 4 is a sectional view of the resetting switch mechanism taken along the line IV—IV of Fig. 5 with certain of the operating parts in other positions than shown in Fig. 3;

Fig. 5 is an end view of the resetting switch mechanism shown in Figs. 3 and 4;

Figs. 6 and 7 are sectional views of another embodiment of a resetting switch with the operating button in different positions;

Fig. 8 is a side elevational view of another embodiment of a resetting switch,

Fig. 9 is an end view of the switch shown in Fig. 8, and

Fig. 10 is a sectional view of another embodiment of a resetting switch.

Figure 1:
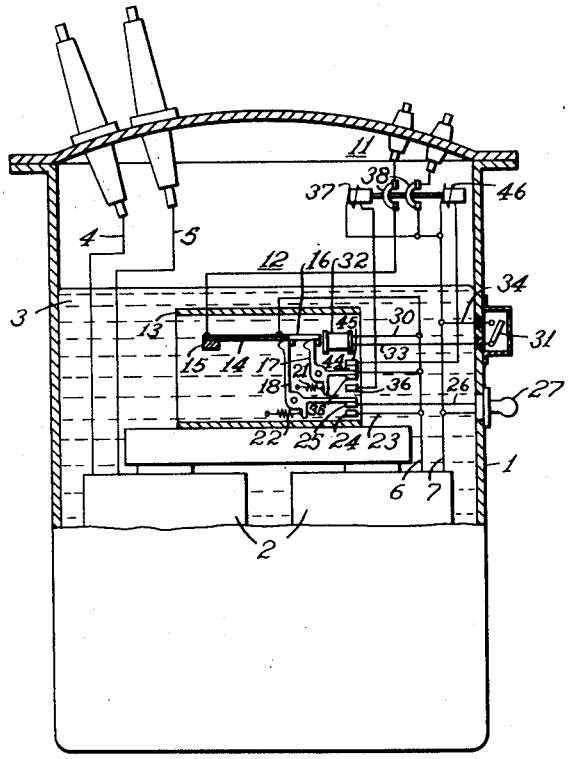
Figure 1 is a diagrammatic view of circuits and apparatus illustrating the application of a thermally controlled relay device for controlling an indicating circuit and a circuit breaker control circuit.
Figure 2:
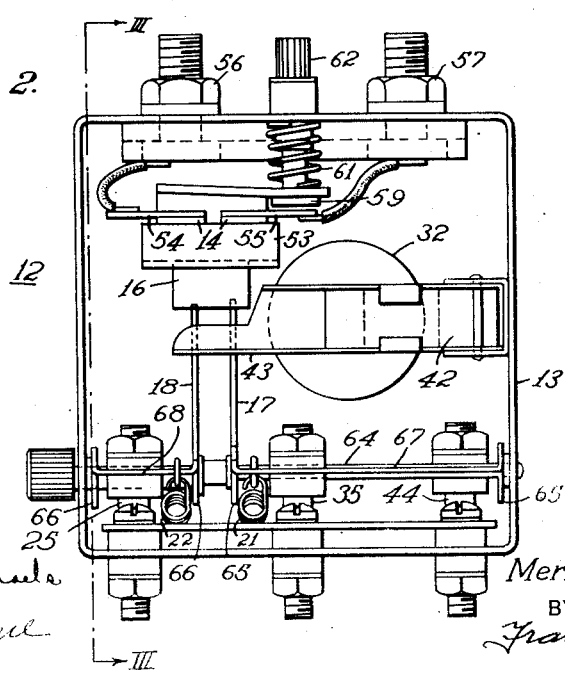
Fig. 2 is an end view of the relay device diagrammatically illustrated in Fig. 1.

Referring to the drawings and, more particularly, to Fig. 1 thereof, an electrical apparatus is illustrated including an apparatus case 1 housing a core and coil assembly 2 immersed in an insulating liquid 3 and provided with high voltage terminal conductors 4 and 5 and low voltage terminal conductors 6 and 7 which may be connected to high voltage and low voltage external circuits through conventional bushings in a well known manner. The circuit breaker, indicated generally at 11, is provided for connecting the conductors 6 and 7 to the outside circuit and is controlled by a relay, indicated generally at 12, that is immersed in the insulating liquid 3. The relay comprises a casing 13 about a bimetal element 14 that is shown included in the circuit of conductor 6 so that the bimetal is responsive both to the flow of current through the conductor 6 and to heat resulting from the temperature of the liquid 3 in which the apparatus is immersed. The bimetal element 14 is so physically arranged that one end is mounted on a relatively fixed abutment 15, and the other end is free to move and carries a catch 16 that is adapted to engage latches 17 and 18 to normally retain them in their illustrated positions against the pull of the springs 21 and 22, respectively. The latches 17 and 18 are so arranged that the latch 18 has the lesser overlap with the catch 16, as best shown in Fig. 2, so that as the bimetal 14 is heated and the catch 16 moves upwardly, the latch arm 18 will be the first to be released. When released, the latch arm 18 will be forced by the spring 22 to close contacts 24 and 25, thus completing a circuit between conductors 6 and 7 through conductor 23, contact members 24 and 25, conductor 26, signal device 27, to conductor 7. The closing of this circuit operates the signal device 27 and notifies the operator that the apparatus is loaded nearly to its maximum capacity, thus giving an opportunity to rearrange the load and prevent further increase in the heating of the apparatus.

Should the overload on the apparatus continue sufficiently that the bimetal element 14 causes the catch 16 to continue its upward movement, the latch arm 17 will also be released and operated by the spring 21 to cause movement of the contact member 35 into engagement with the contact member 36 to close a circuit through the opening winding 37 of the breaker 11 to actuate the contact members 38 from their circuit closing positions and interrupt the load circuit through the apparatus. When the apparatus has cooled sufficiently to permit return of the catch member 16 to a position to engage the latch arms 17 and 18, operation of the switch 31 to its circuit closing position closes a circuit from conductor 7, through conductor 34, switch 31, conductor 33, coil 32 and conductor 30 to the conductor 6 causing the energization of the closing coil 32 energizing its associated core 41 and armature 42, best shown in Figs. 2 and 3, and causing movement of an arm 43 carried by the armature against the latch arms 17 and 18 to return them to their illustrated or latched positions. Upon return of the latch arm 17 to its latched position, a circuit is closed through contact members 44 and 45 for energizing the closing coil 46 of the circuit breaker 11 and operating the contact members 44 and 45 to their circuit closing positions.

It will be appreciated that this circuit is diagrammatic only, and that the circuit may be so arranged that the relay closes one point only in the circuit, the final completion of the circuit being manually controlled after being conditioned by the operation of the relay.

The description thus far has been directed largely to the circuits and basic elements of the apparatus shown in Fig. 1, the detailed arrangement of the parts of the relay device 12, and the resetting switch associated therewith is shown in greater detail in the remaining figures of the drawings.

Referring to Figs. 2 and 3, the bimetal element 14 is positioned with its relatively fixed end mounted on a yoke 15, the outer ends of which are turned down to form flanges 51 that are pivotally mounted on a shaft 52 attached to the casing 13. The movable end of the bimetal 14 carries a molded insulating block 53 upon which the catch 16 is mounted. The bimetal element 14 may be U-shaped and provided with terminals 54 and 55 mounted on the block 53 and connected to terminal studs 56 and 57, respectively, mounted at the top of the casing 13. An adjusting arm 58 is attached to the yoke 15, the outer end of which is positioned by a bolt 59 and spring 61 which may be adjusted by a nut 62. As shown in Figs. 2 and 3, the latch members 17 and 18 are mounted on a shaft 64 extending from one side to the other of the casing 13. The latch members 17 and 18, in addition to the upwardly extending latch arms, are provided with vertical flange portions 65 and 66, respectively, connected by horizontal portions 67 and 68. The vertical flange portions are provided with openings forming the bearings upon the shaft 64 and the horizontal portions carry the movable contact members controlled by the latches.

Referring to Figs. 3, 4 and 5, the resetting switch shown generally at 31 includes a pair of contact members 71 and 72 mounted on metal strips 73 and 74 and connected to studs 75 in a base 76. The strip 73 is shown as a bimetal element which, if sufficiently heated, upon a repeated closure of the switch at short intervals, will move the contact member 71 sufficiently to the left, as illustrated, so that the contact member 72 will not be brought into engagement therewith. The device 31 includes an operating disk 77 mounted on a shaft 78 supported on two vertical supports 79 and 81. At one end of the shaft 78, a crank 82 is provided having a pin 83 to which one end of a spring 84 is attached, the other end being attached to the base 76. The spring 84 biases the disk 77 to its normal or first position, shown in Fig. 3, in which the pin 83 is in its lowest position. The disk 77 likewise carries a cam 85 that is adapted to engage the leaf support 74 during a portion of the revolution of the disk to cause engagement of the contact members 71 and 72. A manually operable knob 87 is mounted on a sleeve extending through the support 79 and carrying a crank arm 88 to the outer end of which a spring ratchet 89 is mounted that is adapted to engage a pin 91 carried by the disk 77.

When it is desired to operate the switch to a circuit closing position, the knob 87 is moved in a direction to turn the disk 77 in a clockwise direction, as viewed in Figs. 3 and 4, by means of the engagement of the spring ratchet 89 with the pin 91, and against the bias of the spring 84 which, during one-half revolution of the disk 77, will move from the position shown in Fig. 3 to the position shown in Figs. 4 and 5 or to the uppermost position for the pin 91. During this movement, the cam 85 has moved to the position shown in Figs. 4 and 5, and a slight further movement of the disk 77 causes it to be moved by the spring 84 in a clockwise direction back to the position shown in Fig. 3 or through a second half revolution.

This motion of the disk is independent of the manual means employed for operating it through the half revolution from the first position. The knob 87 is provided with a pin 99 that is adapted to engage a stop 101 on the upper part of the support 79 to prevent the manually operated knob from movement appreciably beyond the position shown in Figs. 4 and 5. A detent 102 is shown mounted on the base 76 and adapted to engage the projections 103 extending from the ratchet shaped edge of the disk 77 for the double purpose of preventing operation of the disk in a counterclockwise direction and also to limit the rate of movement of the disk while it is being operated through its second half-revolution from the first position by the force of the spring 84. During this second half-revolution of the disk 77, the cam 85 engages the supporting strip 74, causing the contact member 72 to engage the contact member 71 for a short time which is sufficient to energize the coil 32 and effect a resetting of the latch members 17 and 18, as previously described. After a complete revolution of the disk 77, the knob 87 may be turned in a counterclockwise direction, and the spring ratchet 89 will slip over the end of the pin 91 carried by the disk 77 and be in position to again engage this pin for subsequent operation of the switch device.

It will be apparent from the description of the resetting switch device 31 that the period during which the contact members 71 and 72 are engaged is determined by the automatic operation of the device and is independent of the operator so that the coil 32 cannot be maintained continuously energized, thus permitting the use of a much smaller and less expensive resetting mechanism for the relay device 12 than would be the case if a coil capable of withstanding continuous energization were required. Further protection of the coil 32 is provided in that should the resetting switch device 31 be repeatedly operated at close intervals, the bimetal element 73 would become heated sufficiently to prevent continued repeated operation by moving the contact member 71 sufficiently away from the contact member 72 that the cam 85 becomes incapable of causing engagement of the contact members 71 and 72.

Referring to Figs. 6 and 7 of the drawings, a resetting switch 110 is illustrated comprising an insulating casing 111 within which are housed a switch contact member 112 mounted on a support 113 and a switch contact member 114 mounted on the lower wall of the casing 111. Circuit conductors 115 and 116 are provided for closing the circuit through the coil 32 by means of a roller contactor 117. The roller contactor 117 is carried at one end of a rod 118 that normally rests within a pocket formed by a curved end portion 119 of a push button 121 biased to its outer position, shown in Fig. 6, by a spring 122. An abutment 123 is provided on the rod 118 against which one end of a spring 124 is positioned, the other end being positioned against the case 111 for biasing the roller contactor 117 toward the left as shown in the drawings. A piston 125 is provided on the outer end of the rod 118 which travels within a cylinder 126 to provide a dashpot permitting gradual movement only of the roller 117 toward the left as biased by the spring 124.

When it is desired to operate the switch, the push button 121 is forced toward the right as viewed in the drawings causing the roller contactor 117 to travel across the upper surface of the support 113 until it engages the curved outer end 127 of a pawl 128 pivotally supported on a pin 129 and normally biased by a spring 131 to the position shown in Fig. 6. Upon engagement of the roller 117 with the end of the pawl 128, a slight further movement of the roller toward the right causes it to be moved downwardly to the position shown in Fig. 7 as the pawl 128 swings about the pivot pin 129. The roller 117 is thus forced out of the pocket formed by the curved surface 119 in the end of the push button and sufficiently below the lower edge of the curved surface 119 and the upper surface of the support 113 so that as the spring 124 biases the rod 118 and the roller 117 toward the left, the roller will travel along the inclined surface 132 below the support 113 and pass between the spring contacts 112 and 114, as shown in the dotted line position in Fig. 7, closing a circuit therethrough for energizing the closing coil 32. The dash-pot provided by the piston 125 and cylinder 126 delays the movement of the roller 117 so that it is in engagement with the spring contact members 112 and 114 for a sufficient time to energize the coil 32 and cause the resetting of the latches 17 and 18 of the relay 12. The roller 117, after passing between the switch contact members 112 and 114, follows the inclined surface 133 at the end of the housing 111 under the bias of the spring 124 until it is again seated within the pocket formed by the curved surface 119 in the inner end of the push button 121. The push button will have been returned to the position shown in Fig. 6 by the spring 122 prior to the completion of the travel of the roller 117.

In Figs. 8 and 9, a reset switch 140 is illustrated that is operated essentially the same as the reset switch 31 shown in Figs. 3, 4 and 5. A rotatable member 141 is provided mounted upon vertical supports 142 and 143 and normally biased by a spring 144 extending between a base 145 and a pin 146 carried by a crank 147 which acts through a shaft 148 to rotate the member 141. The spring 144 normally biases the pin 146 to the lower part of its travel. When it is desired to operate the switch the knob 151 is turned in a clockwise direction in the same manner as the knob 87 in Fig. 5. This moves the crank 157, operatively connected to the knob 151, carrying the spring ratchet 158 into engagement with a pin 159 carried by the member 141 which is rotated until the pin 151a engages the stop on the support 142, thus bringing the pin 146 to its illustrated position. In this position a conducting segment 152 carried by the rotatable member 141 is substantially at the upper part of its travel. From this point, the spring 144 acting through the pin 146 rotates the member 141 in a clockwise direction as viewed in Fig. 8, bringing the conducting segment 152 into engagement with brushes 153 and 154, thus closing a circuit through the reclosing coil 32 completed through conductors 155 and 156.

Fig. 10 illustrates a further embodiment of a resetting switch for temporarily reclosing a circuit through the closing coil 32 of the relay 12. The switch shown generally at 160 comprises an insulating casing 161, through one end of which terminal conductors 162 and 163 extend. A bimetal element 164 is carried by the lower terminal member 163, and, in turn, carries a switch contact member 165 that is adapted to engage a movable switch contact member 166 to close a circuit through the bimetal element 164 and a heating coil 167 positioned cylindrically about a heat retaining element 170 and the bimetal element 164. The movable contact member 166 is carried by a switch operating member 168 pivotally supported on the casing 161 by a pin 169, and shown as biased by a spring 171 extending from the upper surface of the casing wall to the switch operating lever arm 168 to bias the arm to its illustrated position in engagement with a stop 172 in which position the contact members 165 and 166 are separated. When it is desired to energize the reclosing coil 32, the outer end of the switch operating lever 168 is moved manually against the stop 173, bringing the contact member 166 into engagement with the contact member 165 to complete the circuit through the closing coil 32, the bimetal element 164 and the heating coil 167. Should the switch lever 168 be retained in this position for a short time, the heating of the bimetal element 164 will cause it to move the contact member 165 downwardly out of engagement with the contact member 166 and interrupt the circuit through the closing coil 32. The combined heating effect caused by current flowing through the bimetal element 164 itself and the heating coil 167 will maintain the switch contact members 165 and 166 separated for an appreciable time, so that the coil 32 cannot be overheated.

It will be apparent that many modifications in the apparatus and circuits illustrated and described may be made within the spirit of the invention, and I do not wish to be limited other than by the scope of the appended claims.

I claim as my invention:

1. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, means for operating said switch comprising a cam member, means for biasing said cam member to a first position, means for manually actuating said cam member from said first position in a given direction, said cam member after a predetermined movement from said first position in said direction being operable by said biasing means independently of said manually operable means through a zone of movement for operating said switch to its circuit closing position for a short duration only.

2. In combination, an electrical apparatus, protective means therefor including a circuit interrupter actuated for controlling a circuit upon a predetermined condition of the apparatus, means for resetting said circuit interrupter to its initial position including an electroresponsive element and a switch device for controlling the operation of the electroresponsive element, means for operating said switch device comprising an operating member provided with a cam portion and with a driving projection, means for biasing said operating member to a first position, a manually operable member adapted to engage said driving projection for actuating said operating member in a given direction only from said first position against the action of said biasing member, said members being arranged for releasing engagement after a predetermined movement thereof from the first position to permit operation of said operating member by said biasing means to said first position through an operative range in which said cam portion operates said switch device to its circuit closing position for a short duration only.

3. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, means for operating said switch device comprising an operating member provided with a cam portion and with a driving projection, means for biasing said operating member to a first position, a manually operable member adapted to engage said driving projection for actuating said operating means in a given direction only from said first position against the force of said biasing members, said operating member being operable after a predetermined movement from the first position for actuation by said biasing means to said first position through a range of movement in which said cam portion is effective to operate said switch device to its circuit closing position for a short duration only.

4. In combination, an electrical apparatus, protective means therefor including a circuit interrupter actuated for controlling a circuit upon a predetermined condition of the apparatus, means for resetting said circuit interrupter to its initial position including an electroresponsive element and a switch device for controlling the operation of the electroresponsive element, means for operating said switch device comprising an operating member provided with a cam portion and with a driving projection, means for biasing said operating member to a first position, said operating member having a zone of movement in a given direction from said first position and a zone of return movement in a given direction to said first position, a manually operable member for engaging said driving projection for moving said operating member from said first position through said first zone of movement and releasing said projection for effecting operation of said operating member by said biasing means through said zone of return movement to the first position, said zone of return movement including a position in which said cam portion engages means for actuating said switch contacts into circuit closing position for a short duration only.

5. In combination, an electrical apparatus, protective means therefor including a circuit interrupter actuated for controlling a circuit upon a predetermined condition of the apparatus, means including an electroresponsive element energized for resetting said circuit interrupter to its initial position and a switch device for controlling the operation of the electroresponsive element, means for operating said switch device comprising an operating member provided with a cam portion and with a driving projection, means for biasing said operating member to a first position, said operating member having a zone of movement in a given direction from said first position and a zone of return movement in a given direction to said first position, a manually operable member for engaging said driving projection for moving said operating member from said first position through said first zone of movement and releasing said projection for effecting operation of said operating member by said biasing means through said zone of return movement to the first position, said zone of return movement including a position in which said cam portion engages means for actuating said switch contacts into circuit closing position for a short duration only, and ratchet means for preventing a reverse movement of said operating member through said two zones of movement.

6. In combination, an electrical apparatus, protective means therefor including a circuit interrupter actuated for controlling a circuit upon a predetermined condition of the apparatus, means including an electroresponsive element energized for resetting said circuit interrupter to its initial position and a switch device for controlling the operation of the electroresponsive element, means for operating said switch device comprising a rotatably mounted operating disk having a cam portion, a driving portion and a ratchet portion, a detent for engaging said ratchet portion to permit operation of the disk in one direction only, means for biasing said operating disk to a normal or first position, a manually operable member having a latch for engaging said projection for operating said disk through a first zone of movement whereupon the biasing means becomes effective to operate the disk through a second zone of movement independently of said manually operable means to said first position, and means actuated by said cam portion during the movement of the disk through the second zone of movement for closing said switch for a limited time only.

7. In combination, an electrical apparatus, protective means therefor including a circuit interrupter actuated for controlling a circuit upon a predetermined condition of the apparatus, means including an electroresponsive element energized for resetting said circuit interrupter to its initial position and a switch device for controlling the operation of the electroresponsive element, means for operating said switch device comprising a rotatably mounted operating disk having a cam portion, a driving portion and a ratchet portion, a detent for engaging said ratchet portion to permit operation of the disk in one direction only, means for biasing said operating disk to a normal or first position, a manually operable member having a latch for engaging said projection for operating said disk through a first zone of movement whereupon the biasing means becomes effective to operate the disk through a second zone of movement independently of said manually operable means to said first position, and means actuated by said cam portion during the movement of the disk through the second zone of movement for closing said switch for a limited time only, a stop for limiting the continued movement of the manually operable means in the given direction after movement of the disk through the first zone of movement, and means for limiting the rate of movement of said disk through its second zone of movement.

8. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, a switch operating member for said switch, biasing means for normally biasing said switch operating member to a predetermined circuit interrupting position, manually operable means for actuating said switch operating member from said predetermined circuit interrupting position for effecting operation of said switch to a circuit closing position, and means for permitting the closing of said switch for a predetermined duration only.

9. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, a switch operating member for said switch, biasing means for normally biasing said switch operating member to a predetermined circuit interrupting position, manually operable means for actuating said switch operating member from said predetermined circuit interrupting position through a manually operating zone of movement, said switch operating member being, after completion of its movement through the manually operating zone of movement, automatically operable by said biasing means through a zone of movement for operating said switch to its circuit closing position for a short duration only independently of said manually operable means.

10. In combination, an electrical apparatus, protective means therefor including a circuit interrupter actuated for controlling a circuit upon a predetermined condition of the apparatus, means for resetting said circuit interrupter to its initial position, including an electroresponsive element and a switch for controlling the operation of the electroresponsive element, a circuit controlling member for said switch and a manually operable member for actuating said circuit controlling member, biasing means for biasing said circuit controlling member to a predetermined circuit opening position, said manually operable member being arranged to engage said circuit controlling member for actuating it in a given direction only from said predetermined circuit opening position, against the force of said biasing means, said circuit controlling member being operable after a predetermined movement from the predetermined circuit opening position for operation by said biasing means through a range of movement in which said circuit controlling member is effective to operate said switch to its circuit closing position for a short duration only.

MERRILL G. LEONARD.